(No Model.)  
2 Sheets—Sheet 1.
W. H. CASWELL.
Driving Knitting and other Light Machines by Power.
No. 236,932.  Patented Jan. 25, 1881.
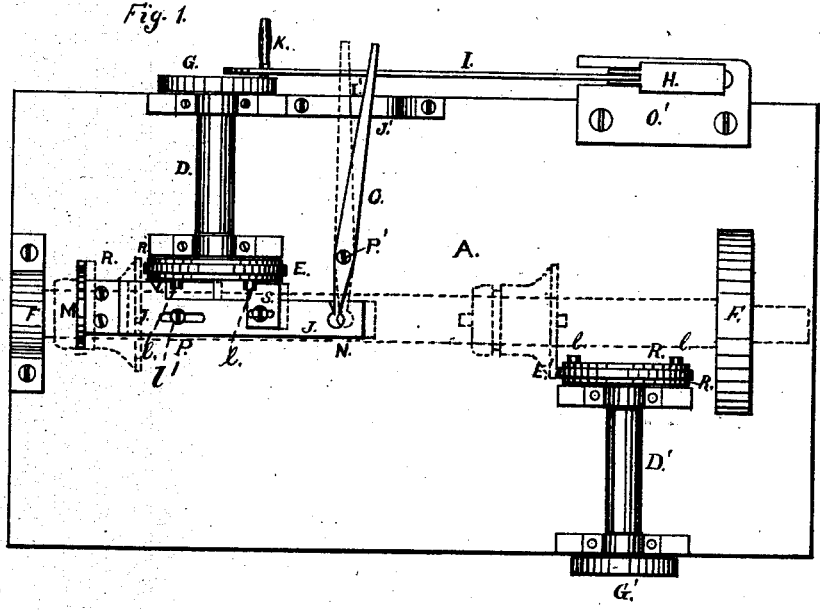
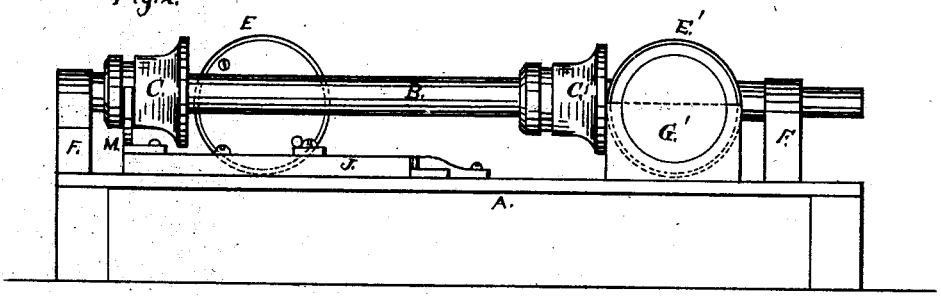
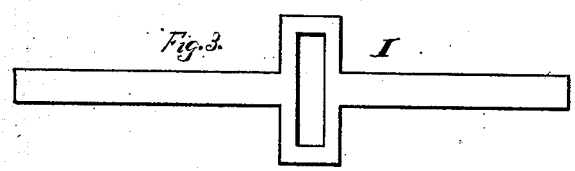
Witnesses  
J. B. Goodman  
W. J. Dulin
Inventor  
Hiram H. Caswell  
By F. B. Hunt  
Atty (No Model.) 2 Sheets—Sheet 2.
W. H. CASWELL.
Driving Knitting and other Light Machines by Power.
No. 236,932. Patented Jan. 25, 1881.
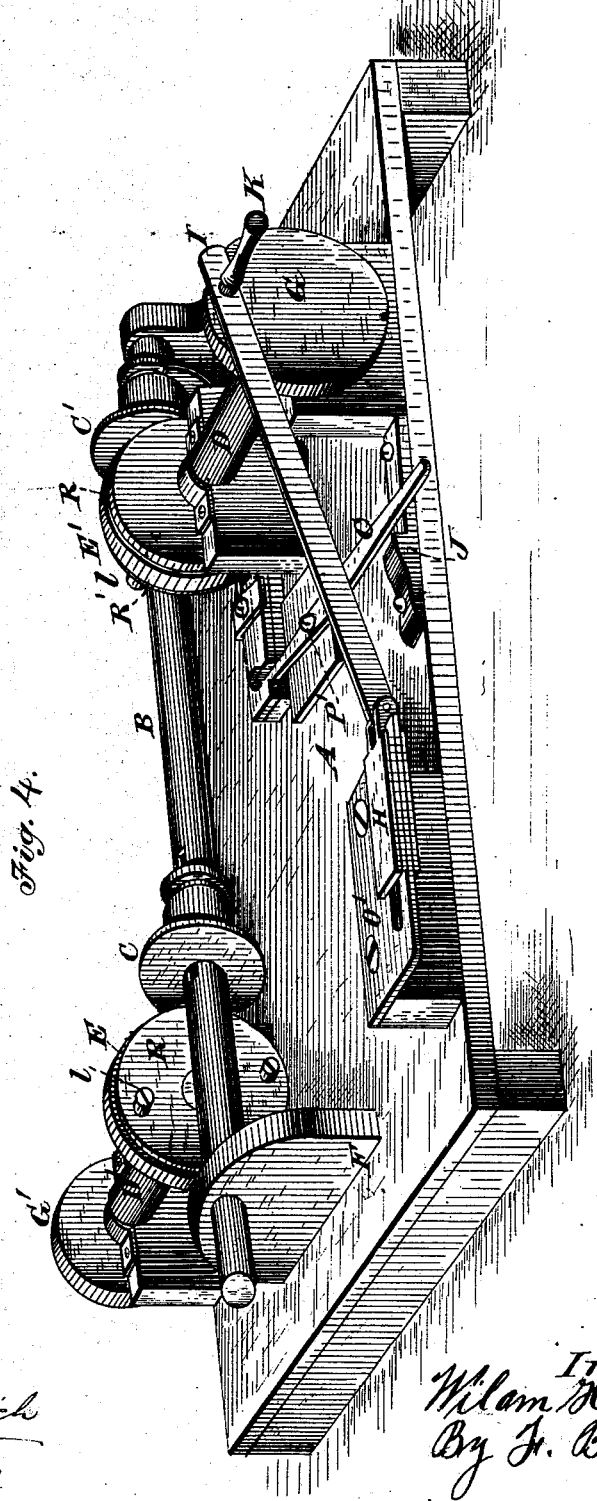
Witnesses
Fred G. Dieterich
John Kizer
Inventor
William H. Caswell
By J. B. Hunt
Atty

UNITED STATES PATENT OFFICE.

WILOM H. CASWELL, OF CONNERSVILLE, INDIANA, ASSIGNOR TO JACOB S. LEONARD AND VALENTINE LEONARD, OF SAME PLACE.

DRIVING KNITTING AND OTHER LIGHT MACHINES BY POWER.

SPECIFICATION forming part of Letters Patent No. 236,932, dated January 25, 1881.

Application filed May 17, 1880. (No model.)

*To all whom it may concern:*

Be it known that I, WILOM H. CASWELL, of Connersville, in the county of Fayette and State of Indiana, have invented certain Improvements in Driving Knitting and other Light Machines by Power, of which the following is a specification.

My invention relates to a novel mode of driving knitting and other light machines by power, as fully described and set forth in the specification and claims.

Figure 1 is a plan view of the machine, the main shaft being shown in dotted lines and the other parts in position for use. Fig. 2 is a side elevation, showing the table or bed upon which the machinery is placed, the main shaft, the friction-wheels, and a slide for moving the wheels into and out of contact with each other. Fig. 3 is a side view of one form of connecting-rod for converting the rotary movement of the driving mechanism into a reciprocating one, and Fig. 4 is a perspective view of the machine and its table.

Similar letters refer to similar parts throughout the several views.

In constructing machines of this type, I provide a table, A, of suitable dimensions for the reception of the machinery. Upon this table A there are placed suitable bearings F F, for the support of a main shaft, B, which extends longitudinally across the table, and has placed upon it one or more sliding friction-wheels, C C'. Upon the same table, but at a right angle to the shaft B, there are placed bearings which support shafts D and D', which carry friction-wheels E and E' on their inner ends, while upon their outer ends are placed cranks or disks G G', having in them handles for giving motion to the reciprocating slide, soon to be described. Upon the upper surface of this table, and immediately underneath the shaft B, there is placed a sliding bar, J, or more than one may be used when the mechanism is employed to drive more than one machine at the same time, as the drawings show it can be made to do. This bar has upon one of its ends a projection, M, (shown in Fig. 2,) the upper surface of which is of such form as to cause it to fit into an annular groove formed in the hub or hubs of the sliding friction-wheels C C', in order that when it is moved in a certain direction said wheels shall be carried into contact with the wheels E E', which will have the effect to communicate motion to the shafts D and D' and the parts connected therewith. The bar J is also provided with a slot, P, through which a bolt, *e'*, passes for the purpose of securing it to the table and holding it in position, and at its inner end with a recess, N, in which the lower end of lever O rests, said lever being pivoted to the table at P', and made to move the slide J in a way soon to be described.

To the upper surface of the sliding-bar J there is affixed a slotted stop, S, which is made to control the movements of said bar, it being so arranged that the heads of the bolts *b b*, passing through the friction-wheels E E', come in contact with it, and thus the movements of the slide H are checked or stopped at each end of its stroke, said bolts *b* in wheels E being placed with reference to the position of connecting-rod I and crank-pin K.

The bearing-surfaces of the wheels E E' may be made of wood, leather, iron, or other suitable material, they being held between flanges or disks R R', which are pressed together by the bolts *b b*.

For the purpose of enabling the operator to work the machine by hand there is placed in one or more of the disks or wheels G a crank or handle, K, it being ordinarily driven by a belt from some prime mover passing over the pulley F placed on the driving-shaft B, as shown in Fig. 1.

When the slide H or the reciprocating parts of the machine are to be put in motion the lever O is to be placed in the position shown in dotted lines in Fig. 1, it being held in its adjusted position by the stop I', which is constructed for that purpose, and when the machine is to be stopped the lever is to be placed in the position shown in full lines in the same figure.

The connecting-rod I is used to convert the rotative movement of the shafts D and D' into a reciprocating motion, and to transmit it to the slide H, from which it may be communicated to any machine in which such a movement is required; and by duplicating the shafts D D', and the wheels which drive them, several knitting, sewing, or other machines may be driven at the same time.

In Fig. 3 there is shown a modified form of connecting-rod I, which has a slot formed in it at a right angle to the greatest length thereof. By allowing the crank-pin K to pass through this slot, and turning the wheel to which it is attached, a reciprocating movement will be imparted to the rod, and by placing the same in suitable bearings the slide H may be dispensed with.

It will be observed that there is a projection, V, upon one side of the outer end of slide J. This projection may be caused to operate as a stop in the event of there being two lines of machines used upon the same table, in which case the friction-wheels would all be made to move in the same direction, the projection M on slide J being placed in its center and the slide changed end for end, when it would perform the functions of the stop S.

Having thus described my invention, what I claim, and desire to secure by Letters Patent, is—

1. The combination of the sliding bar J, stop S, friction-wheels C and E, and projecting bolts $b$ $b$, substantially as set forth.

2. The bar J, provided with a slot, P, projection M, stop S, and lever O, the parts being arranged for joint operation, substantially as set forth.

3. The bar J, carrying the stop S, in combination with the wheel E and bolt-heads $b$ $b$, for the purpose of forming stops, substantially as set forth.

4. The combination and arrangement of the bar J and stops with the wheel E, shaft D, wheel G, connecting-rod I, and slide H, substantially as set forth.

5. The combination and arrangement of the slide H, connection I, wheel G, shaft D, friction-wheels E and C, bar J, stop S, bolt-heads $b$ $b$, lever O, and stop I', all substantially as set forth.

6. The bar J, provided with the slot P and projections V and M, in combination with the wheel E and bolt-heads $b$ $b$, the parts being arranged substantially as set forth.

WILOM H. CASWELL.

Witnesses:
R. A. DURNAN,
W. C. FORREY.